Patented Aug. 7, 1945

2,381,344

UNITED STATES PATENT OFFICE 2,381,344

SYNTHESIS OF HCN AND CATALYST THEREFOR

Howard Donovan Green, Pasadena, Calif., assignor to E. I. du Pont de Nemours & Company, Wilmington, Del., a corporation of Delaware No Drawing. Application February 1, 1944, Serial No. 520,701

2 Claims. (Cl. 23—151)

This invention relates to the manufacture of hydrocyanic acid and more particularly, to the production of hydrocyanic acid by the catalytic reaction between a nitrogen compound and a hydrocarbon.

Various methods for producing hydrocyanic acid by reacting nitrogenous compounds with carbonaceous materials have been proposed. One method of producing hydrocyanic acid in this way comprises reacting a nitrogenous compound with a gaseous hydrocarbon or hydrocarbon vapor in the presence of a platinum metal catalyst. Two examples of this method may be mentioned, viz., (a) the use of ammonia and (b) the use of nitric oxide as the nitrogenous compound.

One proposed method of making hydrocyanic acid by the reaction of a hydrocarbon with ammonia in the presence of a platinum metal catalyst is carried out by passing a mixture of ammonia, oxygen and an excess of hydrocarbon gas or vapor at a suitable reaction temperature, e. g., 400° C. or higher, over the catalyst. The reaction of ammonia with a hydrocarbon is endothermic but the amount of oxygen and of excess hydrocarbon may be so adjusted that the heat evolved by the exothermic reaction between the excess hydrocarbon and the oxygen is somewhat greater than the heat required for the endothermic reaction between the ammonia and the hydrocarbon; hence the net result of the combined reaction is somewhat exothermic. This method of producing hydrocyanic acid by the reaction of ammonia with a hydrocarbon is described in Andrussow, U. S. Patent 1,934,838.

A method of producing hydrocyanic acid by reacting nitric oxide with a hydrocarbon in the presence of a platinum metal catalyst is described in U. S. patent, Lacy, U. S. P. 2,076,953. According to this method, a mixture of nitric oxide, excess hydrocarbon and preferably a small amount of oxygen and water vapor, together with a diluent gas, such as nitrogen, is heated, e. g., to 300 to 400° C., and passed over a platinum metal catalyst. In a preferred method of carrying out this nitric oxide process, the nitric oxide is produced by oxidizing ammonia with an excess of air and the hot off gas from the ammonia oxidation, which consists of nitric oxide, water vapor, nitrogen, and a small proportion of oxygen, is mixed with hydrocarbon and the mixture is passed over the catalyst at a suitable temperature.

In the above-mentioned processes, the catalyst used may be one of the platinum metals, i. e., platinum, rhodium, iridium, palladium, osmium or ruthenium, or a mixture or alloy of two or more of these metals. Such platinum metal catalysts have heretofore been used in the processes for producing hydrocyanic acid in the massive state, i. e., in the form of sheets, wires, turnings, etc., the preferred form being one or more layers of fine wire gauze, through which the reactant gases are passed. In practicing these processes, considerable difficulty has been experienced because of corrosion and disintegration of the catalytic metal. This corrosive action of the reactive gases upon the catalytic metal necessitates rather frequent replacement of the catalyst and also may result in loss of the expensive catalytic metal.

This problem has been met by the method described in Bond et al., U. S. P. 2,083,824 wherein the catalyst used is a refractory material the surface of which is coated with the platinum metal. Such a catalyst is made by wetting the surface of a granular refractory with a solution of a platinum metal compound, drying and then heating to a high temperature, e. g., 500 to 1400° C. to decompose the platinum metal compound and form the metal coating on the refractory. The best results are obtained by using a substantially non-porous refractory, such as vitreous silica, and heating in the presence of a non-reducing gas, such as air or nitrogen, to decompose the platinum metal compound.

An object of the present invention is to provide an improved method for producing hydrocyanic acid by reacting a nitrogen compound with a hydrocarbon in the presence of a platinum metal catalyst. A further object is to prevent loss of catalyst activity and loss of the catalytic metal due to disintegration. A further object is to provide means whereby the platinum metal may be used in the massive form, e. g., as wire gauze or the like, substantially without loss of catalytic activity and without loss of metal resulting from disintegration thereof. Another object is to provide a novel arrangement of the platinum metal catalyst for carrying out the above-described reaction. Still other objects will be apparent from the following description of my invention.

In practicing the present invention, I pass the reacting gases over the surface of a platinum metal in massive form, for example, platinum alloy wire gauze, which is contiguous to a bed or layer of granular refractory material in such manner that the gases, after passing over the metal, pass directly in contact with the refractory. By way of illustration, in one method of practicing my invention I may place a suitable layer of the granular refractory on a suitable perforated support and place one or more layers of a platinum metal wire gauze on the layer of the refractory. The reacting gases then are passed downwardly through the wire gauze and thence through the granular refractory.

This mode of operation does not prevent disintegration of the platinum metal, but I have discovered that as the platinum metal becomes disintegrated and gradually disappears, the granular refractory material becomes coated with a thin, adherent layer of the metal, which has high catalytic activity. Providing that the layer of refractory material is sufficiently deep in proportion to the amount of metal used in the catalyst arrangement, by the time all of the metal has disintegrated and disappeared, the metal thus disintegrated will appear as a coating on the refractory, with substantially no loss of the metal. The metal-coated refractory material has a high degree of catalytic activity and may be used for a long time without re-activation. My process thus eliminates the necessity of a separate operation for coating metal onto the refractory and enables the use of the preferred wire gauze.

While I prefer to use platinum metal wire gauze, other massive forms of platinum metal are suitable and can be used, for example, perforated disks, wire coils, sheets, rods, tubes, beads, turnings, sponge or the like. In any suitable arrangement, the metal will be arranged so that the gas can pass over the surface of it and thereafter directly into contact with the granular refractory material. In one suitable method, one or more layers of the metal in any desired form are interspersed with one or more layers of the granular refractory to form a catalyst bed. In another method, particles or small pieces of the metal may be mixed with the granular refractory. The gases may pass upwardly or downwardly through the catalyst bed or the bed may be arranged for passage of gases in the horizontal direction.

My invention is further illustrated by the following examples:

Example 1

A bed of 10 cc. of 6-10 mesh granular beryl about 1 inch deep was placed on a perforated sillimanite support plate in a vertical reaction tube. On this bed was laid a mat of 7 circles of wire gauze made of a platinum-rhodium alloy containing 10% of rhodium and 90% of platinum, cut to fit the reaction tube and having a total weight of 1.08 gms. Above this gauze was placed an overlay of about 1 inch (10 cc.) of 6-10 mesh beryl.

This catalyst bed was used to make hydrocyanic acid by the reaction of natural gas with nitric oxide. A mixture of ten volumes of air and one volume of ammonia was passed over a platinum-rhodium alloy catalyst in the form of a wire gauze to substantially completely oxidize the ammonia to nitric oxide. The resulting hot mixture of nitric oxide, excess air, and water vapor was mixed with 1.85 volumes of natural gas and the mixture was passed directly through the above-described catalyst bed in a downward direction. As the reaction proceeded, the wire gauze gradually disintegrated and disappeared and at the same time the beryl below the gauze acquired a coating of the platinum alloy. The temperature of the gases leaving the catalyst bed was maintained at 975° C. and the rate of flow of the ammonia through the apparatus at 500 cc. per minute. The yield of hydrocyanic acid, based on the amount of ammonia used, was 46%.

Example 2

A catalyst bed was built up with 7 circles of wire gauze as in Example 1, spaced equidistant in the reaction tube and separated by beds of 10-20 mesh granular beryl. The total depth of the bed was 1 inch, and had a volume of about 10 cc. The total weight of the screen used was 0.82 gms. The alternate layers of beryl and screen were arranged with a beryl layer on the bottom and a screen on the top of the bed.

The above-described bed was utilized to react natural gas with nitric oxide to produce hydrocyanic acid by the method of Example 1, using one volume of ammonia, ten volumes of air and 1.4 volumes of natural gas with a rate of flow of ammonia of 600 cc. per minute and an off gas temperature of 940° C. The yield of hydrocyanic acid was 65% based on the ammonia used.

Example 3

The method of Example 2 was repeated except that a layer about 1 inch deep of 10-20 mesh of beryl was placed on top of the catalyst bed. The proportion of natural gas was 1.7 volumes to one volume of ammonia. The ammonia flow rate was 400 cc. per minute and the off gas temperature was 1000° C. A 60% yield of hydrocyanic acid was obtained.

Example 4

In this example the catalyst bed of Example 2 was utilized but the hydrocyanic acid was formed by directly reacting a mixture of one part ammonia, 1.6 parts of natural gas and 10 parts of air, this reaction mixture being preheated and passed through the catalyst bed, the reaction temperature being regulated so that the off gas temperature was 1050° C. With a flow rate of 600 cc. of ammonia per minute, a 45% yield of hydrocyanic acid was obtained.

In the above examples, inspection of the catalyst bed after operation disclosed no evidence of loss of platinum metal from the bed. The refractory material lying beneath the platinum metal acquired a permanent coating of metal having high catalytic activity. The catalyst bed of Example 2 was operated for 20 days without substantial loss in catalytic activity. At the end of this time, the wire gauze circles had completely disappeared except for small parts of the two lower screens.

In practicing my invention, I prefer to use a substantially non-porous, refractory material capable of withstanding temperatures as high as 1200 to 1400° C. without disintegration or other damage. Fused quartz, fused silica, fused alumina and crushed natural beryl are examples of suitable refractory materials. Still others will be apparent to the skilled chemist. It is essential that the refractory be in granular form in order to obtain the desired results. The size of the granules may be varied over a wide range, the only limitation being that the particles should not be so small as to impede gas flow. Generally I prefer to use granular material of about 6-10 mesh size.

I claim:

1. A process for the manufacture of hydrocyanic acid by reacting nitric oxide with a hydrocarbon in the vapor phase which comprises passing the reacting gases through a layer of wire gauze made of a platinum-rhodium alloy and thence through a contiguous layer of a substantially non-porous, granular, refractory material.

2. A process for the manufacture of hydrocyanic acid by reacting ammonia with a hydrocarbon and oxygen in the vapor phase which comprises passing the reacting gases through a layer of platinum metal wire gauze and thence through a contiguous layer of a substantially non-porous, granular, refractory material.

HOWARD DONOVAN GREEN.